US012631259B2

(12) United States Patent　　　　(10) Patent No.: US 12,631,259 B2
Kiffer et al.　　　　　　　　　　　　(45) Date of Patent: May 19, 2026

(54) 2×7 ROTARY VALVE

(71) Applicant: Air Products and Chemicals, Inc., Allentown, PA (US)

(72) Inventors: Micah S. Kiffer, Kutztown, PA (US); Gordon Jonas, Schwenksville, PA (US); Roger D. Whitley, Allentown, PA (US); Shubhra Jyoti Bhadra, Naperville, IL (US)

(73) Assignee: Air Products and Chemicals, Inc., Allentown, PA (US)

( * ) Notice: Subject to any disclaimer, the term of this patent is extended or adjusted under 35 U.S.C. 154(b) by 320 days.

(21) Appl. No.: 18/215,856

(22) Filed: Jun. 29, 2023

(65) Prior Publication Data

US 2025/0003507 A1　　Jan. 2, 2025

(51) Int. Cl.
B01D 53/02　　　(2006.01)
B01D 53/04　　　(2006.01)
B01D 53/047　　(2006.01)
F16K 11/072　　(2006.01)

(52) U.S. Cl.
CPC ........ F16K 11/072 (2013.01); B01D 53/0446 (2013.01); B01D 53/047 (2013.01); B01D 2259/40028 (2013.01); B01D 2259/40043 (2013.01)

(58) Field of Classification Search
CPC .......... B01D 2259/40005; B01D 2259/40028; B01D 2259/40043; B01D 53/0446; B01D 53/047; F16K 11/072; F16K 11/074
See application file for complete search history.

(56) References Cited

U.S. PATENT DOCUMENTS

| | | | |
|---|---|---|---|
| 4,614,205 A | 9/1986 | Oroskar | |
| 5,814,130 A | 9/1998 | Lemcoff et al. | |
| 5,891,217 A | 4/1999 | Lemcoff et al. | |
| 6,063,461 A | 5/2000 | Hoyle et al. | |
| 6,889,710 B2 | 5/2005 | Wagner | |
| 7,500,490 B2 | 3/2009 | Wagner | |
| 7,819,948 B2 | 10/2010 | Wagner | |
| 8,272,401 B2 | 9/2012 | McLean | |
| 2004/0094216 A1* | 5/2004 | Wagner ................ | B01D 53/047 |
| | | | 137/625.46 |
| 2007/0028971 A1* | 2/2007 | Wagner .............. | B01D 53/0446 |
| | | | 137/625.15 |
| 2012/0111435 A1 | 5/2012 | Antonetti | |
| 2020/0054988 A1* | 2/2020 | Wagner ................ | B01D 53/047 |

FOREIGN PATENT DOCUMENTS

| | | |
|---|---|---|
| CN | 207137637 | 3/2018 |
| JP | 4110210 | 4/1992 |
| JP | 2007046784 | 2/2007 |

* cited by examiner

*Primary Examiner* — Christopher P Jones
(74) *Attorney, Agent, or Firm* — Robert A. Diaz

(57) ABSTRACT

Disclosed herein are rotary valve assemblies, comprising a single rotor, for use in adsorption based separation processes. Also disclosed are adsorption based separation apparatuses including said rotary valve assemblies, and adsorption based separation processes using said adsorption based separation apparatuses.

2 Claims, 11 Drawing Sheets

Time → / Bed →

| F1 | F2 | F3 | F4 | EQD1 | DEQD2 | BD1 | BD2 | PU1 | PU2 | PU3 | DEQR2 | EQR1 | RP/F |
|----|----|----|----|------|-------|-----|-----|-----|-----|-----|-------|------|------|
| F3 | F4 | EQD1 | DEQD2 | BD1 | BD2 | PU1 | PU2 | PU3 | DEQR2 | EQR1 | RP/F | F1 | F2 |
| EQD1 | DEQD2 | BD1 | BD2 | PU1 | PU2 | PU3 | DEQR2 | EQR1 | RP/F | F1 | F2 | F3 | F4 |
| BD1 | BD2 | PU1 | PU2 | PU3 | DEQR2 | EQR1 | RP/F | F1 | F2 | F3 | F4 | EQD1 | DEQD2 |
| PU1 | PU2 | PU3 | DEQR2 | EQR1 | RP/F | F1 | F2 | F3 | F4 | EQD1 | DEQD2 | BD1 | BD2 |
| PU3 | DEQR2 | EQR1 | RP/F | F1 | F2 | F3 | F4 | EQD1 | DEQD2 | BD1 | BD2 | PU1 | PU2 |
| EQR1 | RP/F | F1 | F2 | F3 | F4 | EQD1 | DEQD2 | BD1 | BD2 | PU1 | PU2 | PU3 | DEQR2 |

FIG. 10B

2×7 ROTARY VALVE

TECHNICAL FIELD

This disclosure relates to rotary valve assemblies for use in adsorption based separation processes, to adsorption based separation apparatuses including said rotary valve assemblies, and to adsorption based separation processes using said adsorption based separation apparatuses.

BACKGROUND

Adsorption based separation process are processes in which one or more components of a feed stream (typically a gaseous feed stream) are separated from one or more other components of the feed stream by passing the feed stream through one or more adsorbent beds. The adsorbent (or adsorbents) present in said bed(s) is (or are) absorbent(s) of a type that preferentially adsorbs one or more components of the feed steam in comparison to one or more other components of the feed stream, such that the resulting product stream exiting the bed(s) is depleted in said preferentially adsorbed components and enriched in said components that are not preferentially adsorbed. Once the adsorbent bed(s) reach or near a point of saturation with the adsorbed component(s), either the bed(s) have to be replaced, or the bed(s) have to be regenerated by desorbing and removing the adsorbed component(s) from the bed(s).

Various types of adsorption based separation processes are known in the art, including pressure swing adsorption (PSA) based process and temperature swing adsorption (TSA) based processes. In pressure swing adsorption based processes the adsorbent bed(s) are regenerated by reducing the pressure in the bed(s) to desorb the adsorbed component(s) from the bed(s), while in temperature swing adsorption based processes the adsorbent bed(s) are regenerated by increasing the temperature in the bed(s) (typically by passing a heated purge gas through the bed(s)) to desorb the adsorbed component(s) from the bed(s). Also known in the art are pressure and temperature swing adsorption (PTSA) processes, in which the adsorbent bed(s) are regenerated by both reducing the pressure and elevating the temperature in the bed(s). Exemplary pressure swing adsorption based process that are known in the art include: pressure swing adsorption (PSA) processes, in which the feed stream is introduced into the adsorbent bed(s) at elevated (above atmospheric) pressures to adsorb one or more components from the feed stream and then the pressure in the bed(s) is reduced (for example to atmospheric pressure) to regenerate the bed(s); vacuum swing adsorption (VSA) processes in which the feed stream is introduced into the adsorbent bed(s) at atmospheric pressure to adsorb one or more components from the feed stream and then the pressure in the bed(s) is reduced to sub-atmospheric pressures to regenerate the bed(s); and pressure/vacuum swing adsorption (PVSA) processes in which the feed stream is introduced into the adsorbent bed(s) at elevated (above atmospheric) pressures to adsorb one or more components from the feed stream and then the pressure in the bed(s) is reduced to sub-atmospheric pressures to regenerate the bed(s).

It is typical in all such processes to use multiple beds of adsorbent and for each bed to undergo an adsorption/regeneration cycle comprising a plurality of steps, at least one which will be a feed step (during which the feed stream is introduced into the bed to adsorb component(s) of the feed stream and produce a product stream depleted in these component(s) that is withdrawn from the bed), and at least one of which will be a regeneration step (during which adsorbed component(s) are desorbed and removed from the bed), with the cycles in the beds being staggered so that different beds are on different steps of the cycle at the same time.

For example, in a typical PSA based process, each bed undergoes an adsorption/regeneration cycle comprising a feed step, a blowdown step (in which the gas is evacuated from the bed reducing the pressure in the bed and desorbing adsorbed components), and a re-pressurization step (in which the pressure in the bed is increased back up to the feed pressure, typically by introducing the feed and/or some of the product into the bed). Typically, the cycle will also include a purge step, after the blowdown step and prior to the re-pressurization step, during which a purge gas (for example some of the product) is passed through the bed to assist with desorption and removal of the adsorbed component(s). Depending on the number of beds being used, the cycle may also include equalization steps, in which one bed that has completed its feed step is placed in fluid flow communication with another bed that has completed its purge step so as to equalize the pressure between the two beds, thereby partly depressurizing the bed that has completed its feed step and partly repressurizing the bed that has completed its purge step. At any one point in time during this process different beds may be on different steps of this cycle. For example, in a process employing several beds and all of the aforementioned steps, at any particular point in time one or more beds may be on the feed step while other beds may be on equalization, blowdown, purge step or re-pressurization steps.

In order to control which streams are entering and exiting each adsorbent bed, and hence which step of the adsorption/regeneration cycle each bed is undergoing, some form of valve assembly or arrangement of valves is required.

Rotary valve assemblies are a type of valve assembly that have been known in the art and used for many decades. Rotary valve assemblies provide a reliable way to contain, direct and redirect flow to different outlets when compared to conventional switch valves. They are often used to reduce the total amount of valves required in a process, and/or when rapid opening/closing of switch valves would be detrimental to operating life. Generally, however, rotary valve assemblies are of much higher cost than switch valves, as rotary valve assemblies typically require large parts that have to be custom made/machined. Consequently, there is a continuous desire to develop rotary valves that are of reduced size and cost for any given flow capacity.

Various forms of rotary valve have been used in the art for controlling the flow of fluid to and from the beds of adsorbent in adsorption based separation processes.

U.S. Pat. No. 6,063,161 describes a rotary valve assembly for use in a PSA process having feed, equalization, blowdown, purge and re-pressurization steps. The assembly comprises two separate rotary valves, each of the these valves comprising its own rotor contained in its own housing. One of these valves controls the flow of fluid to and from the feed ends of the adsorbent beds, the rotor of this valve having a feed channel for receiving and directing flow of the feed stream to the bed(s) undergoing the feed step, and blowdown channels for receiving blowdown streams from the beds undergoing the blowdown and purge steps. The other of these valves controls the flow of fluid between the product ends of the adsorbent beds, the rotor of this valve containing various equalization channels for receiving and directing streams between the beds undergoing the various equalization steps and the bed undergoing the re-pressurization step.

Each of the rotary valves uses springs and/or gas pistons to provide contact pressure required for sealing between the flat end surface (i.e. the sealing face) of the rotor and the stator/housing. Each of the rotors is driven by its own drive linkage, which drive linkages are in turn connected to and driven by a shared variable speed drive and motor so as to ensure that the two valves are driven and operated in a synchronized manner.

U.S. Pat. No. 7,500,490 describes a rotary valve assembly for use in a PVSA process having feed, equalization, blow-down, purge and re-pressurization steps. The rotary valve comprises two rotors contained within a single housing and driven by the same drive shaft. One of the rotors is feed rotor for controlling the flow of fluid to and from the feed end of the adsorbent beds, this rotor having a feed channel for receiving and directing flow of the feed stream to the bed undergoing the feed step, and a blowdown channel for receiving a blowdown stream from the bed undergoing the blowdown or purge steps. The other of the rotors is a product rotor for controlling the flow of fluid to and from the product ends of the adsorbent beds, the rotor having a product channel for receiving the product stream from the bed undergoing the feed step and delivering a portion of this gas to the bed undergoing the re-pressurization step, and an equalization channel for directing an equalization stream between the beds undergoing the equalization step. A spring positioned between the two rotors biases the two rotors away from each other and against the stator/housing to provide contact pressure required for sealing between the flat end surfaces (i.e. the sealing faces) of each rotor and the stator/housing. The drive shaft is connected to the feed rotor, and rotation of the feed rotor is transmitted also to the product rotor by means of drive lugs on the side of the feed rotor that engage with mating lugs on the side of the product rotor.

CN207137637 describes a rotary valve assembly for use in a PSA process. The rotary valve comprises a single elongate cylindrical rotor contained within a housing, whereby the rotor contains various channels for directing flow of fluid to and from the adsorbent beds. The curved side surface of the rotor forms the sealing surface with the stator/housing, with all of the openings of the various channels being on said curved side surface of the rotor.

SUMMARY

Disclosed herein are rotary valve assemblies for use in adsorption based separation processes. Also disclosed are adsorption based separation apparatuses including said rotary valve assemblies, and adsorption based separation processes using said adsorption based separation apparatuses.

The rotary valve assemblies disclosed herein use a single rotor, comprising a unitary component or a component formed of two or more parts that are rigidly attached to each other, for directing fluid to or from both the feed and product end of the adsorbent beds. The rotor has flat end surfaces that form flat sealing faces with the housing, and feed and product channels. The feed channel has openings in one of the end surfaces allowing for fluid flow communication between the feed port of the housing and the feed end bed port(s) with which the channel is aligned. The product channel has openings in the other of the end surfaces allowing for fluid flow communication between the product port of the housing the product end bed port(s) with which the channel is aligned. The disclosed rotary valve assemblies have a compact and robust design, that also limits the size and quantity of custom manufactured components and thereby reduces also the overall cost of the rotary valve assembly.

Several preferred aspects of the rotary valve assemblies and PSA apparatus and processes according to the present invention are outlined below.

Aspect 1: A rotary valve assembly for use in an adsorption based separation process, the rotary valve assembly comprising:

a housing having a feed port for introduction of a feed stream, a product port for withdrawal of a product stream, and a plurality of pairs of bed ports, each pair of bed ports being for connection in fluid flow communication to an adsorbent bed and consisting of a feed end bed port for sending fluid to or receiving fluid from a feed end of the adsorbent bed and a product end bed port for sending fluid to or receiving fluid from a product end of the adsorbent bed; and a rotor rotatably mounted within the housing, the rotor comprising a component having a first end surface, a side surface and a second end surface and containing a plurality of channels that are separate from each other and comprise at least a feed channel and a product channel, said component being a unitary component or a component formed of two or more parts that are rigidly attached to each other;

wherein the first and second end surfaces of the rotor form flat sealing surfaces with the housing, the feed channel has a first opening in the first end surface that is in fluid flow communication with the feed port, the product channel has a first opening in the second end surface that is in fluid flow communication with the product port, and the feed channel has a second opening in the first end surface that can, via rotation of the rotor within the housing, be brought into and out of alignment and hence fluid flow communication with each feed end bed port, and the product channel has a second opening in the second end surface that can, via rotation of the rotor within the housing, be brought into and out of alignment and hence fluid flow communication with each product end bed port, such that via rotation of the rotor within the housing the second openings of the feed and product channels can be brought into and out of fluid flow communication with each pair of bed ports.

Aspect 2: A rotary valve assembly according to Aspect 1, wherein the first opening of the feed channel is positioned at the center of the first end surface of the rotor at least substantially coaxially with the axis of rotation of the rotor, and wherein the first opening of the product channel is positioned at the center of the second end surface of the rotor at least substantially coaxially with the axis of rotation of the rotor.

Aspect 3: A rotary valve assembly according to Aspect 1 or 2, wherein the rotary valve assembly further comprises a hollow drive shaft connected to the rotor for rotating the rotor within the housing and that forms either:

a conduit between the feed port and the first opening of the feed channel for transfer of the feed stream from the feed port to the first opening of the feed channel; or a conduit between the product port and the first opening of the product channel for transfer of the product stream from the first opening of the product channel to the product port.

Aspect 4: A rotary valve assembly according to in any one of Aspects 1-3, wherein:

the feed end bed ports are angled outwards away from the axis of rotation of the rotor; and/or the product end bed ports are angled outwards away from the axis of rotation of the rotor.

Aspect 5: A rotary valve assembly according to any one of Aspects 1-4, wherein the second opening of the feed channel in the first end surface and the second opening of the product channel in the second end surface are positioned at the same or substantially the same circumferential and radial location of the rotor.

Aspect 6: A rotary valve assembly according to any one of Aspects 1-5, wherein the feed channel has a third opening in the first end surface that can, via rotation of the rotor within the housing, be brought into and out of alignment and hence fluid flow communication with each feed end bed port, and the product channel has a third opening in the second end surface that can, via rotation of the rotor within the housing, be brought into and out of alignment and hence fluid flow communication with each product end bed port, such that via rotation of the rotor within the housing the third openings of the feed and product channels can be brought into and out of fluid flow communication with each pair of bed ports.

Aspect 7: A rotary valve assembly according to Aspect 6, wherein the third opening of the feed channel in the first end surface and the third opening of the product channel in the second end surface are positioned at a the same or substantially the same circumferential and radial location of the rotor.

Aspect 8: A rotary valve assembly according to any one of Aspects 1-7, wherein the housing further comprises a blowdown port for withdrawal of a blowdown stream, and the plurality of channels of the rotor further comprise a first blowdown channel, the first blowdown channel having a first opening that is in fluid flow communication with the blowdown port and a second opening in the first end surface that can, via rotation of the rotor within the housing, be brought into and out of alignment and hence fluid flow communication with each feed end bed port.

Aspect 9: A rotary valve assembly according to Aspect 8, wherein the first opening of the first blowdown channel is in the side surface of the rotor, the side surface of the rotor being spaced from the housing so as to form with the housing a channel around the rotor for transfer of the blowdown stream from the first opening of the first blowdown channel to the blowdown port.

Aspect 10: A rotary valve assembly according to Aspect 8 or 9, wherein the housing further comprises a purge inlet port for introduction of a purge stream, and the plurality of channels of the rotor further comprise a purge channel separate, the purge channel having a first opening that is in fluid flow communication with the purge inlet port and a second opening in the second end surface that can, via rotation of the rotor within the housing, be brought into and out of alignment and hence fluid flow communication with each product end bed port, such that via rotation of the rotor within the housing the second openings of the purge and first blowdown channels can be brought into and out of fluid flow communication with each pair of bed ports.

Aspect 11: A rotary valve assembly according to Aspect 10, wherein the first opening of the purge channel is in the second end surface and is in the form of an annular opening that encircles, but is separate from, the first opening of the product channel.

Aspect 12: A rotary valve assembly according to Aspect 10 or 11, wherein the plurality of channels of the rotor further comprise a second blowdown channel, the second blowdown channel having a first opening that is in fluid flow communication with the blowdown port and a second opening in the first end surface that can, via rotation of the rotor within the housing, be brought into and out of alignment and hence fluid flow communication with each feed end bed port.

Aspect 13: A rotary valve assembly according to any one of Aspects 8-12, wherein:

the second opening of the second blowdown channel has the shape of an arcuate slot of non-uniform width, whereby the slot has a section near the leading edge of the slot where the width the slot narrows at the leading end of the section and then gradually widens towards the lagging end of the section; and/or the second opening of the first blowdown channel has the shape of an arcuate slot of non-uniform width, whereby the slot has a section near the leading edge of the slot where the width the slot narrows at the leading end of the section and then gradually widens towards the lagging end of the section.

Aspect 14: A rotary valve assembly according to any one of Aspects 1-13, wherein the plurality of channels of the rotor further comprise one or more pressure equalization channels, each pressure equalization channel having either:

a first opening in the second end surface that can, via rotation of the rotor within the housing, be brought into and out of alignment and hence fluid flow communication with each product end bed port, and a second opening in the second end surface that can, via rotation of the rotor within the housing, be brought into and out of alignment and hence fluid flow communication with each product end bed port, wherein the first and second openings of the pressure equalization channel are positioned such that when first opening is in fluid flow communication with one of the product end bed ports the second opening is in fluid flow communication with another one of the product end bed ports; or a first opening in the first end surface that can, via rotation of the rotor within the housing, be brought into and out of alignment and hence fluid flow communication with each feed end bed port, and a second opening in the first end surface that can, via rotation of the rotor within the housing, be brought into and out of alignment and hence fluid flow communication with each feed end bed port, wherein the first and second openings of the pressure equalization channel are positioned such that when first opening is in fluid flow communication with one of the feed end bed ports the second opening is in fluid flow communication with another one of the feed end bed ports.

Aspect 15: A rotary valve assembly according to any one of Aspects 1-14, wherein:

the feed end bed ports have circular openings facing the rotor and one or more of openings in the first end surface selected from the second opening of the feed channel, the third opening of the feed channel, the second opening of the first blowdown channel, the second opening of the second blowdown channel, and the first and/or second openings of one or more of the pressure equalization channels has an inverse circle shaped leading edge and/or lagging edge; and/or the product end bed ports have circular openings facing the rotor and one or more of the openings in the second end surface selected from the second opening of the product channel, the third opening of the product channel, the second opening of the purge channel, and the first and/or second openings of one or more of the pressure equalization channels has an inverse circle shaped leading edge and/or lagging edge.

Aspect 16: A rotary valve assembly according to any one of Aspects 1-15, wherein one or more of the channels in the rotor are fitted with a removable fitting for restricting the flow rate of fluid through the channel between two of the channel's openings.

Aspect 17: A rotary valve assembly according to Aspect 16, wherein the removable fitting is a threaded flow control orifice inserted into the channel via an opening in the side surface of the rotor.

Aspect 18: An adsorption based separation apparatus comprising:

a plurality of adsorbent beds, each of the adsorbent beds having a feed end and a product end;

a rotary valve assembly according to any one of Aspects 1-17, each of the adsorbent beds being connected in fluid flow communication to a different one of the pairs of bed ports of the housing of the rotary valve assembly; and a motor for driving rotation of the rotor of the rotary valve assembly.

Aspect 19: An adsorption based separation process, wherein the process uses the adsorption based separation apparatus of Aspect 18 and comprises:

introducing a feed stream into the feed port of the rotary valve assembly, the feed stream comprising two or more components;

operating the motor so as to rotate the rotor of the rotary valve assembly so as to cyclically bring each adsorbent bed into and out of fluid flow communication with the feed and product channels of the rotor;

for each adsorbent bed, when the adsorbent bed is in fluid flow communication with the feed and product channels of the rotor, delivering the feed stream from the feed channel to the adsorbent bed, adsorbing one or more components of the feed stream preferentially to one or more other components of the feed stream so as to produce a product stream enriched in said one or more other components of the feed stream, and withdrawing the product stream from the adsorbent bed into the product channel;

withdrawing the product stream from the product port of the rotary valve assembly; and for each adsorbent bed, during a period of time when the adsorbent bed is not in fluid flow communication with the feed and product channels of the rotor, desorbing adsorbed components of the feed gas stream from the adsorbent bed and withdrawing a blowdown stream from the adsorbent bed comprising said desorbed components.

Aspect 20: The adsorption based separation process of Aspect 19, wherein the adsorption based separation process is a pressure swing adsorption based process, wherein:

the feed stream is introduced into the feed port of the rotary valve assembly at a first pressure; and the step of desorbing adsorbed components of the feed gas stream from the adsorbent bed and withdrawing a blowdown stream from the adsorbent bed comprising said desorbed components comprises reducing the pressure in the adsorbent bed from the first pressure to a second pressure by withdrawing as a first part of the blowdown stream a blowdown gas comprising said desorbed components, and introducing a purge gas into the adsorbent bed and withdrawing as a second part of the blowdown stream and at the second pressure a blowdown gas comprising the purge gas and said desorbed components.

BRIEF DESCRIPTION OF THE DRAWINGS

FIG. 10 depicts an exemplary multi-step PSA process that can be implemented using an adsorption based separation apparatus comprising seven adsorbent beds connected in fluid flow communication to the rotary valve assembly of FIG. 1. FIG. 10B is a table showing what step of the PSA cycle each of the adsorbent beds is undergoing at any given point in time.

DETAILED DESCRIPTION

Figure 1:
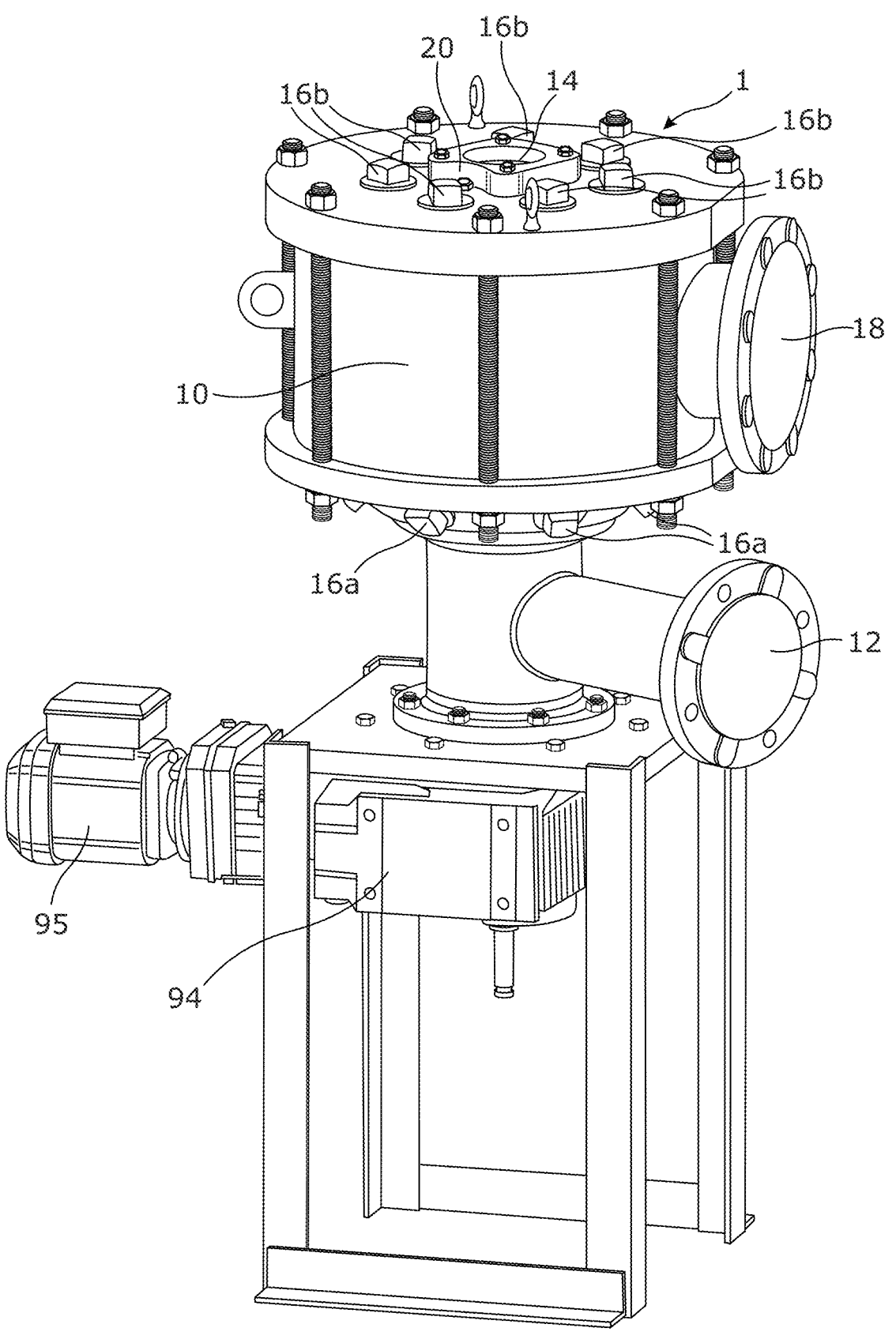
FIG. 1 is an isometric view of a rotary valve assembly in accordance with an exemplary embodiment of the present invention.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. Various changes may be made in the function and arrangement of elements without departing from the spirit and scope of the invention, as set forth in the appended claims.

Described herein are rotary valve assemblies for use in adsorption based separation process, adsorption based separation apparatuses including said rotary valve assemblies, and adsorption based separation processes using said adsorption based separation apparatuses.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

As used herein, "first," "second," "third," etc. are used to distinguish from among a plurality of steps and/or features, and are not indicative of the total number, or relative position in time and/or space unless expressly stated as such.

As used herein, the term "comprising" means consisting of or including.

As used herein, the phrase "and/or" placed between a first entity and a second entity includes any of the meanings of (1) only the first entity, (2) only the second entity, and (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

As used herein, the phrase "feed end" when used in reference to an adsorbent bed refers to the end of the bed into which the feed stream is introduced during the feed step of an adsorption based separation process. As noted above, the feed step is the step of the process during which the feed stream is introduced into the bed to adsorb component(s) of the feed stream and produce a product stream depleted in these component(s) that is withdrawn from the bed.

As used herein, the phrase "product end" when used in reference to an adsorbent bed refers to the end of the bed from which the product stream is withdrawn during the feed step of an adsorption based separation process.

It should be noted that although the product stream withdrawn from the product end of the bed during the feed step is often the desired commercial end product of the process, depending on the process in question this is not always the case. In some cases, the product stream may be subjected to additional downstream processing steps (such as for example additional purification steps) in order to obtain the desired commercial end product. Additionally or alternatively, the or a desired commercial end product may comprise one or more of the components of the feed stream that are preferentially adsorbed by the adsorbent beds during the feed step, in which case the or a desired commercial end product may comprise some or all of stream of desorbed gases generated during one or more regeneration steps of the adsorption/regeneration cycle (such as for example some or all of the blowdown stream generated during a blowdown and/or purge step of the cycle), which stream of desorbed gas may also be subjected to additional downstream processing steps if and as necessary.

Where reference is made herein to the opening of a channel being "aligned" or "brought into alignment" with a bed port, this does not (unless specifically indicated) mean that the edges of the opening are perfectly aligned with the edges of the bed port. Rather, it means that at least part of the opening of the channel overlaps with at least part of the bed port such that fluid can flow from the opening of the channel into the bed port or vice-versa. Similarly, where reference is made to the opening of a channel being or "brought out of alignment" with a bed port or not being in alignment with a bed port, this means that no part of the opening of the channel overlaps with the bed port such that that fluid cannot flow from the opening of the channel into the bed port or vice-versa. Where used herein in reference to a channel that comes into and out of alignment with a bed port, the "leading edge" of an opening or "leading end" of a section of the opening, refers the edge of the opening or end of the section that first passes over the bed port. Similarly, the phrase "lagging edge", when used with reference to an opening of a channel that comes into and out of alignment with a bed port, refers the edge of the opening that last passes over the bed port as the opening comes out of alignment with the bed port.

As used herein, reference to a component of the rotor being "unitary" component means that said component is formed as and of a single part.

As used herein, reference to two or more parts of the rotor being "rigidly attached" to each other means that said parts are fixed to each other in such a way as to allow for no or substantially no relative movement between the parts under the operating pressures within the rotor housing when the rotary valve is in use.

Referring now to FIGS. 1 to 9, a rotary valve assembly in accordance with an exemplary embodiment of the present invention is shown.

The rotary valve assembly is for use in an adsorption based separation process for controlling the flow of fluid entering and exiting the adsorbent beds. In the specific embodiment depicted in FIGS. 1 to 9 the rotary valve assembly is intended for use in a PSA based process, such as for example a PSA, VSA, PVSA or PTSA process, that uses seven adsorbent beds. However, in alternative embodiments the rotary valve assembly could be for use in another type of adsorption based separation process, such as for example a TSA process, and/or be for use in a process that uses a greater or lesser number of adsorbent beds.

The adsorption based separation process may be used for processing any feed stream containing two or more components that can be separated by means of passing the feed stream through one or more adsorbent beds containing absorbent(s) that preferentially adsorbs one or more component(s) of the feed stream in comparison to one or more other component(s) of the feed stream, so as to a produce a product stream that is depleted in said preferentially adsorbed component(s) and enriched in said component(s) that are not preferentially adsorbed. For example, the process may be used for producing an $N_2$-enriched product stream (for example as separated from an air feed stream using adsorbent that preferentially adsorbs $O_2$), an $H_2$-enriched product stream (for example as separated from an synthesis gas feed stream using one or more adsorbents that preferentially adsorb $CH_4$ and other impurities, such as for example $CO$, $CO_2$ and/or $N_2$), a $CO_2$-depleted product stream (for example as separated from a flue gas feed stream using adsorbent that preferentially adsorbs $CO_2$, wherein a desorbed $CO_2$-enriched stream generated during a regeneration step of the process, such as for example a blowdown steam generated during a blowdown and/or purge step, may constitute the or an desired commercial end product), an Ar-enriched product stream (for example as separated from feed stream comprising $O_2$ and Ar using adsorbent that preferentially adsorbs $O_2$), or an $O_2$-enriched product stream (for example as separated from an air feed stream using adsorbent that preferentially adsorbs $N_2$). Suitable adsorbents having the desired selectivity are well known in the art.

Figure 2:
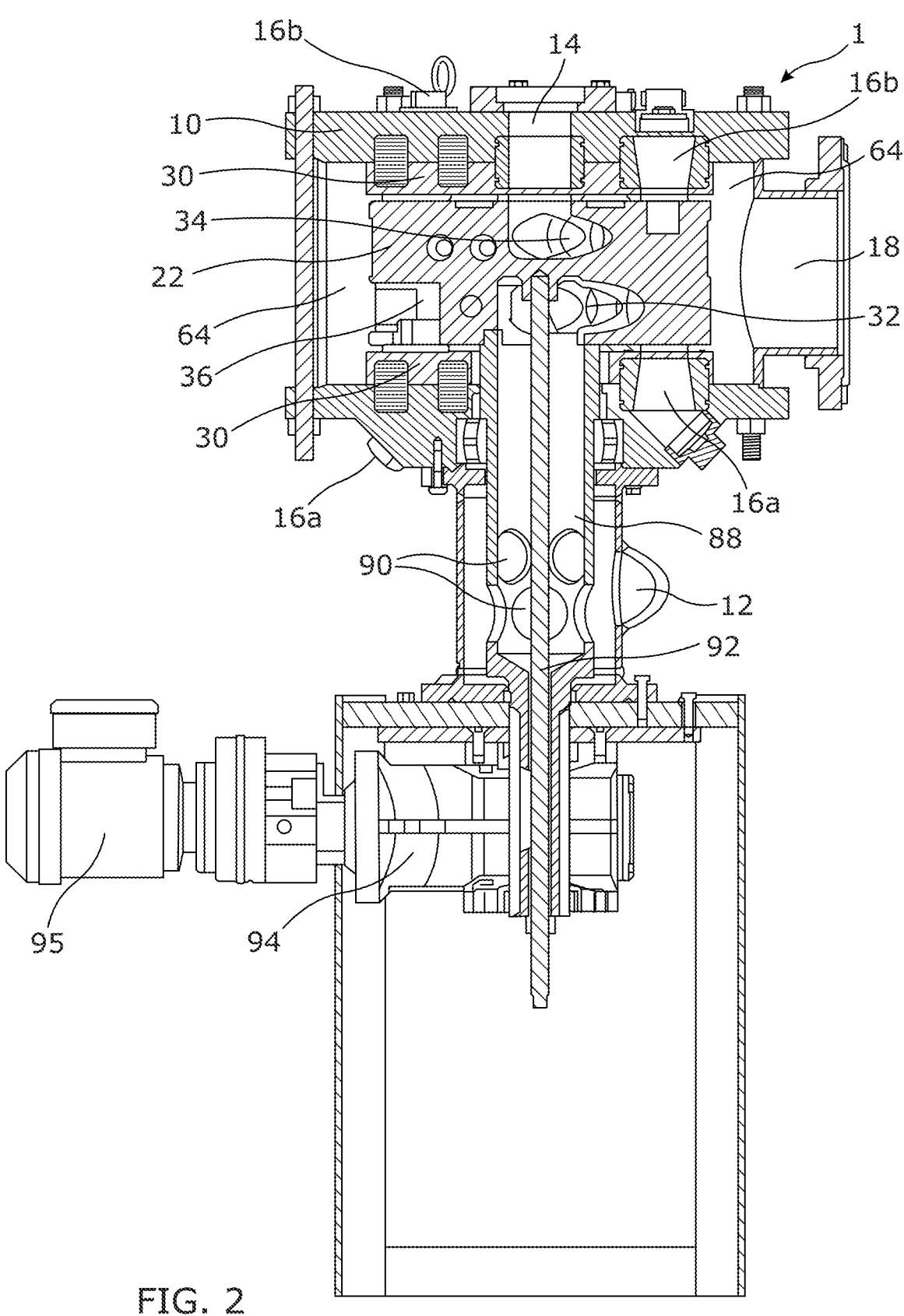
FIG. 2 is a vertical cross-section view of the rotary valve assembly of FIG. 1.
Figure 9A:
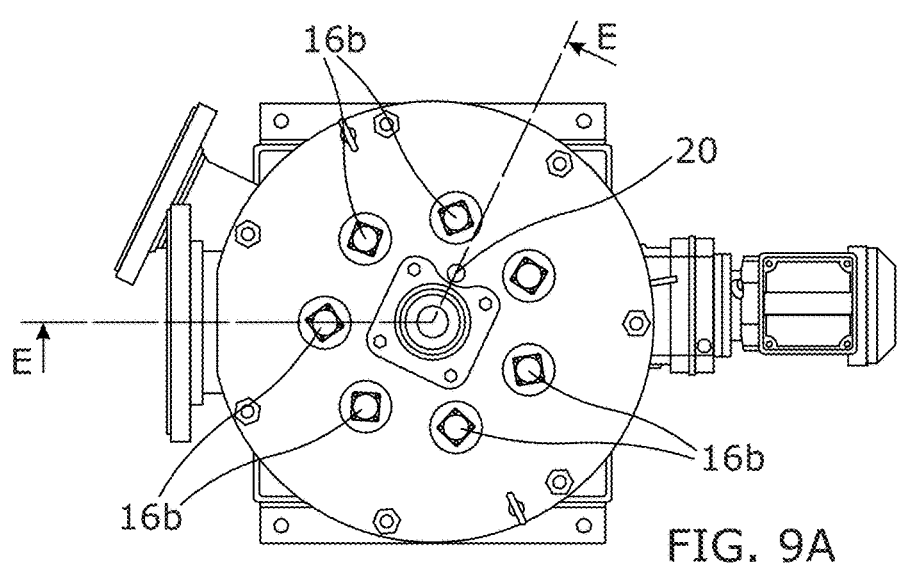
FIG. 9A is a top-down view of the rotary valve assembly of FIG. 1.
Figure 9B:
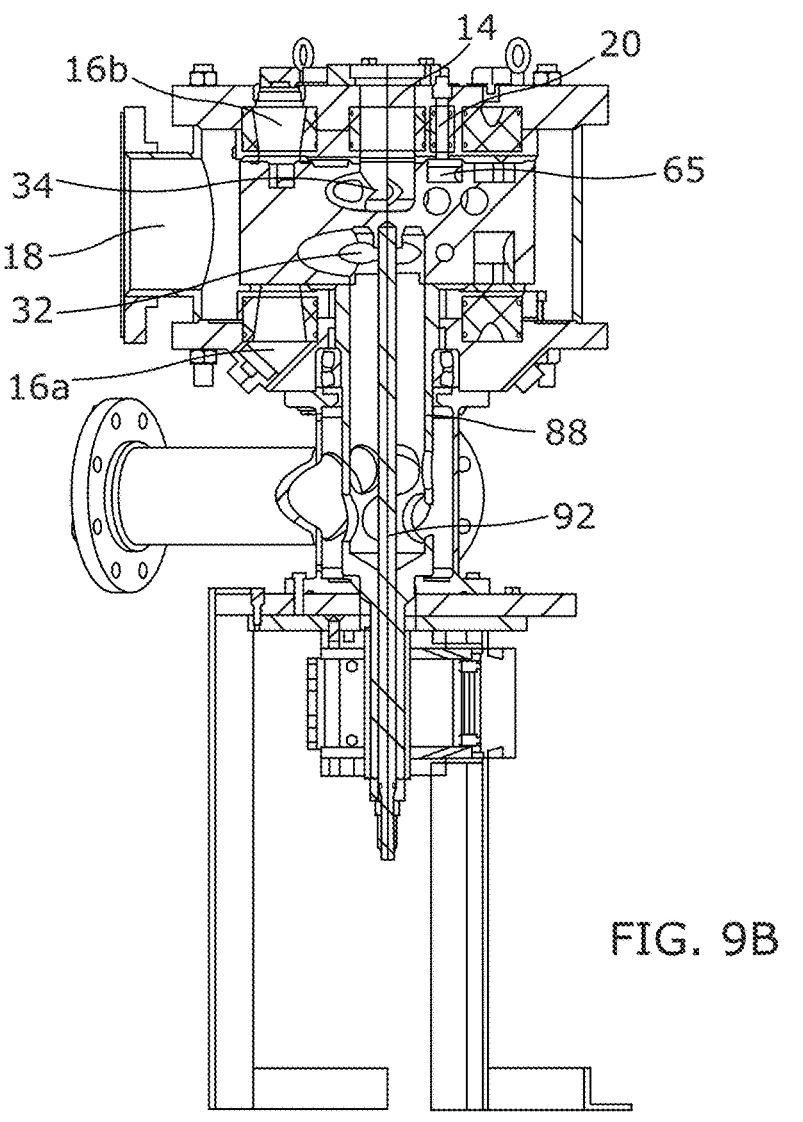
FIG. 9B is vertical cross-section view of the rotor of the rotary valve assembly of FIG. 1, taken along the cutting plane E-E shown in FIG. 9A.

Referring, in particular, to FIGS. 1, 2 and 9, the rotary valve assembly 1 comprises a housing 10 having a feed port 12 for introduction of a feed stream, a product port 14 for withdrawal of a product stream, a blowdown port 18 for withdrawal of a blowdown stream, a purge inlet port 20 for introduction of a purge stream, and a plurality of pairs of bed ports 16, each pair of bed ports being for connection in fluid flow communication to an adsorbent bed (not shown) and consisting of a feed end bed port 16a for sending fluid to or receiving fluid from a feed end of the adsorbent bed and a product end bed port 16b for sending fluid to or receiving fluid from a product end of the adsorbent bed. As noted above, in the specific embodiment depicted in these Figures the rotary valve assembly is intended for use with seven adsorbent beds, and thus in the embodiment shown the housing has seven pairs of bed ports. However, in other arrangements the rotary valve assembly could be for use with a greater or lesser number of beds, and thus could have a greater or lesser number of pairs of bed ports.

The rotary valve assembly further comprises a rotor 22 rotatably mounted within the housing 10. The rotor 22 comprises a component having a first end surface 24 (also referred to herein as the feed side of the rotor), a second end surface 26 (also referred to herein as the product side of the rotor), and a side surface 28 and containing a plurality of channels that are separate from each other. In the depicted embodiment, the component is generally cylindrically shaped component, having flat first and second end surfaces 24, 26 and a curved side surface 28, but in other embodiments the rotor could comprise a component of a different shape having flat end surfaces and one or more side surfaces, such as for example where the component has the general shape of a uniform prism (e.g. a hexagonal prism, a heptagonal prism, an octagonal prism, etc.). In the depicted embodiment the component is a unitary component, i.e. it is formed as and of a single part, which is preferred, but in other embodiments the component could be formed of two or more parts that are rigidly attached to each other, such as for example via the use of one or more fixings (such as for example one or more screws or bolts), welding and/or suitable adhesives.

The first end surface 24 and the second end surface 26 of the rotor 22 each form flat sealing surfaces with the housing 10. Sealing between said end surfaces and the housing may be achieved by any suitable means. For example, as depicted in FIG. 2, the housing may further comprise energized flat face seals 30 (energized with pressure actuated pistons and/or springs) that provide an energized sealing surface between the housing and the first and second end surfaces of the rotor.

The plurality of channels of the rotor 22 (which channels are, as noted above, separate from each other) include at least a feed channel 32 and a product channel 34. With reference in particular to FIGS. 3 to 8, in the depicted embodiment the channels further comprise a first blowdown channel 36, a second blowdown channel 38, a purge channel 40, a first pressure equalization channel 44, a second pressure equalization channel 42 and a third pressure equalization channel 46.

The feed channel 32 has first 48, second 52 and third 56 openings in the first end surface 24 of the rotor, and the product channel 34 has first 50, second 54 and third 58 openings in the second end surface 26 of the rotor. The first opening 48 of the feed channel 32 is in fluid flow communication with the feed port 12, for receiving the feed stream from the feed port, and is positioned at the center of the first end surface 24 of the rotor, preferably at least substantially coaxially with the axis of rotation of the rotor. Similarly, the first opening 50 of the product channel 34 is in fluid flow communication with the product port 14, for delivering the product stream to the product port, and is positioned at the center of the second end surface 26 of the rotor, preferably at least substantially coaxially with the axis of rotation of the rotor.

The second opening 52 of the feed channel 32 is positioned such that it can, via rotation of the rotor within the housing, be brought into and out of alignment and hence fluid flow communication with each feed end bed port 16a, and the second opening 54 product channel 34 is positioned such that can, via rotation of the rotor within the housing, be brought into and out of alignment and hence fluid flow communication with each product end bed port 16b, such that via rotation of the rotor within the housing the second openings of the feed and product channels can be brought into and out of fluid flow communication with each pair of bed ports. In the depicted embodiment, the second opening 52 of the feed channel has the shape of an arcuate slot of sufficient length to allow this opening to be aligned with two adjacent feed end bed ports 16a at the same time, and the second opening 54 product channel likewise has the shape of an arcuate slot of sufficient length to allow this opening to be aligned with two adjacent product end bed ports 16b at the same time, such that the feed and product channels can be in fluid flow communication with two adjacent pairs of bed ports at the same time. As will be explained in more detail below with reference to the exemplary PSA cycle depicted in FIG. 10, the second opening 52 of the feed channel is used to deliver the feed stream to feed end bed ports 16a with which it is aligned, and the second opening 54 product channel is used to receive the product stream from product end bed ports 16b with which it is aligned, so as to implement the feed step of the PSA cycle in beds connected in fluid flow communication with pairs of bed ports that are in alignment with said second openings of the feed and product channels.

The third opening 56 of the feed channel 32 is positioned such that it can, via rotation of the rotor within the housing, be brought into and out of alignment and hence fluid flow communication with each feed end bed port 16a, and the third opening 58 of the product channel 34 is positioned such that it can, via rotation of the rotor within the housing, be brought into and out of alignment and hence fluid flow communication with each product end bed port 16b, such that via rotation of the rotor within the housing the third openings of the feed and product channels can be brought into and out of fluid flow communication with each pair of bed ports. As will be explained in more detail below with reference to the exemplary PSA cycle depicted in FIG. 10, the third opening 56 of the feed channel is used to deliver part of the feed stream to the feed end bed port 16a with which it is aligned, and the third opening 58 of the product channel is used to deliver part of the product stream to the product end bed port 16*b* with which it is aligned, so as to implement a feed and product repressurization step of the PSA cycle the bed connected in fluid flow communication with the pair of bed ports that are in alignment with said third openings of the feed and product channels. It should be noted that in an alternative arrangement only one of the feed and product channels could have a third opening (the other channel having only the first and second openings), so that only a feed or only a product repressurization is carried out. In yet another arrangement, both the feed and product channels could have only the first and second openings (neither having a third opening), with the second opening of the feed and/or product channel being used to first repressurize the beds prior to the feed step being carried out.

Preferably, the second opening 52 of the feed channel 32 in the first end surface 24 and the second opening 54 of the product channel 34 in the second end surface 26 are positioned (as shown) at the same or substantially the same circumferential and radial location of the rotor, and the third opening 56 of the feed channel 32 in the first end surface 24 and the third opening 58 of the product channel 34 in the second end surface 26 are positioned (and as shown) at a the same or substantially the same circumferential and radial location of the rotor. This provides a pressure-balanced arrangement of the feed and product channels, whereby pressure exerted between the rotor and housing on the feed side of the rotor as a result of the high pressure feed stream in the feed channel is counterbalanced by pressure exerted between the rotor and housing on the product side of the rotor as a result of the high pressure product stream in the product channel. This, in turn, results in a smaller moment on the rotor, which is of assistance in minimizing the size of the rotary valve assembly without compromising the robustness of the assembly. Preferably, the second opening 52 of the feed channel 32 and the second opening 54 of the product channel 34 also have (as shown) the same radial width, which further assists with providing a pressure-balanced arrangement. For the same reason (i.e. providing a pressure-balanced arrangement), it is also preferred that the feed and product end bed ports also have the 16*a*, 16*b* have the same cross-sectional open area as each other.

The first blowdown channel 36 has a first set of openings 60 and a second opening 62. The first set of openings 60 of the first blowdown channel are in the side surface of the rotor and are in fluid flow communication with the blowdown port 18, the side surface 28 of the rotor being spaced from the housing 10 so as to form with the housing a 64 channel around the rotor 22 for transfer of a blowdown stream from the first set of openings 60 of the first blowdown channel to the blowdown port 18. It should be noted that although in the depicted embodiment the first set of openings 60 consists of three openings, a greater or lesser number of openings could be used, including use of a single opening. The second opening 62 of the first blowdown channel is positioned in the first end surface 24 such that this can, via rotation of the rotor within the housing, be brought into and out of alignment and hence fluid flow communication with each feed end bed port 16*a*. In the depicted embodiment, the second opening 62 of the blowdown channel has the shape of an arcuate slot of sufficient length to allow this opening to be aligned and hence be in fluid flow communication with two adjacent feed end bed ports 16*a* at the same time. The second opening 62 of the first blowdown channel is used to receive blowdown streams from feed end bed ports 16*a* with which it is aligned.

The purge channel 40 has a first opening 65 and a second opening 66 in the second end surface 26 of the rotor. The first opening 65 of the purge channel is in fluid flow communication with the purge inlet port 20, for receiving the purge stream from the purge inlet port, and is in the form of an annular opening in the second end surface of the rotor that encircles, but is separate from, the first opening 50 of the product channel 34. The second opening 66 of the purge channel 40 is positioned such that it can, via rotation of the rotor within the housing, be brought into and out of alignment and hence fluid flow communication with each product end bed port 16*b*, such that via rotation of the rotor within the housing the second opening 66 of the purge channel 40 and second opening 62 of the first blowdown channel 36 can be brought into and out of fluid flow communication with each pair of bed ports. In the depicted embodiment, the second opening 66 of the purge channel has the shape of an arcuate slot of sufficient length to allow this opening to be aligned and hence be in fluid flow communication with two adjacent product end bed ports 16*b* at the same time. The second opening 66 of the purge channel is used to deliver the purge stream to product end bed ports 16*b* with which it is aligned.

The second blowdown channel 38 has a first opening 68 and a second opening 70. The first opening 68 of the second blowdown channel is (like the first set of openings 60 of the first blowdown channel) in the side surface of the rotor and is in fluid flow communication with the blowdown port 18, for delivering a blowdown stream to the blowdown port. The second opening 70 is in the first end surface and is positioned such that it can, via rotation of the rotor within the housing, be brought into and out of alignment and hence fluid flow communication with each feed end bed port 16*a*. The second opening 70 of the second blowdown channel 38 is used to receive a blowdown stream from the feed end bed port 16*a* with which it is aligned.

As will be explained in more detail below with reference to the exemplary PSA cycle depicted in FIG. 10, in one arrangement the second blowdown channel 38 is used to implement a first part of the blowdown step of the PSA cycle in the bed connected to the feed end bed port 16*a* with which second opening 70 of the second blowdown channel 38 is aligned, and the purge channel 40 and first blowdown channel 36 are used to implement the purge step of the PSA cycle in beds connected in fluid flow communication with pairs of bed ports that are in alignment with the second openings 66, 62 of the purge 40 and first blowdown 36 channels, whereby the first blowdown channel 36 is also used to implement a second part of the blowdown step in a bed connected to a feed end bed port 16*a* that has come into alignment with the second opening 62 of the first blowdown channel but whose product end bed port 16*b* has not yet come into alignment with the second opening 66 of the purge channel. A benefit of this arrangement is that it helps prevent the blowdown gas that is exiting a bed undergoing the first part of the blowdown step from causing back pressure in, and hence potentially reverse flow in, those beds that are undergoing the second part of the blowdown step or undergoing the purge step, due to fact that the higher pressure blowdown gas from the bed that is undergoing the first part of the blowdown step and the lower pressure blowdown gas form the beds undergoing the second part of the blowdown step or the purge step are entering separate blowdown channels and are therefore not mixing in the same blowdown channel. It should be noted, however, that in other arrangements the second blowdown channel 38 could be used to implement all of the blowdown step and the first blowdown channel 36 used only to implement (in conjunction with the purge channel 40) the purge step; while in yet other arrangements the second blowdown channel 38 could be dispensed with and the first blowdown channel 36 used to implement the blowdown step before implementing the purge step in conjunction with the purge channel 40 (or indeed there could be no separate blowdown step and just a combined blowdown and purge step).

The first pressure equalization channel 44 has a first opening 76 in the second end surface 26 of the rotor that can, via rotation of the rotor within the housing, be brought into and out of alignment and hence fluid flow communication with each product end bed port 16_b_, and a second opening 78 in the second end surface 26 of the rotor that can, via rotation of the rotor within the housing, be brought into and out of alignment and hence fluid flow communication with each product end bed port 16_b_, with the first and second openings of the channel being positioned such that when first opening is in fluid flow communication with one of the product end bed ports the second opening is in fluid flow communication with another one of the product end bed ports. The first opening 76 of the first pressure equalization channel is used to receive a pressure equalization stream from the product end bed port 16_b_ with which it is aligned, and the second opening 78 of the first pressure equalization channel is used to deliver the pressure equalization stream to the product end bed port 16_b_ with which it is aligned.

The second pressure equalization channel 42 has a first opening 72 in the second end surface 26 of the rotor that can, via rotation of the rotor within the housing, be brought into and out of alignment and hence fluid flow communication with each product end bed port 16_b_, and a second opening 74 in the second end surface 26 of the rotor that can, via rotation of the rotor within the housing, be brought into and out of alignment and hence fluid flow communication with each product end bed port 16_b_, with the first and second openings of the channel being positioned such that when first opening is in fluid flow communication with one of the product end bed ports the second opening is in fluid flow communication with another one of the product end bed ports. The first opening 72 of the second pressure equalization channel is used to receive a pressure equalization stream from the product end bed port 16_b_ with which it is aligned, and the second opening 74 of the second pressure equalization channel is used to deliver the pressure equalization stream to the product end bed port 16_b_ with which it is aligned.

The third pressure equalization channel 46 has a first opening 82 in the first end surface 24 of the rotor that can, via rotation of the rotor within the housing, be brought into and out of alignment and hence fluid flow communication with each feed end bed port 16_a_, and a second opening 80 in the first end surface 24 that can, via rotation of the rotor within the housing, be brought into and out of alignment and hence fluid flow communication with each feed end bed port 16_a_, with the first and second openings of the channel being positioned such that when first opening is in fluid flow communication with one of the feed end bed ports the second opening is in fluid flow communication with another one of the feed end bed ports. The first opening 82 of the third pressure equalization channel is used to receive a pressure equalization stream from the feed end bed port 16_a_ with which it is aligned, and the second opening 80 of the second pressure equalization channel is used to deliver the pressure equalization stream to the feed end bed ports 16_a_ with which it is aligned.

As will be explained in more detail below with reference to the exemplary PSA cycle depicted in FIG. 10, the first pressure equalization channel 44 is used to implement an equalization depressurization step in the bed connected in fluid flow communication to the product end bed port 16_b_ that is in alignment with the first opening 76 of the first pressure equalization channel and an equalization repressurization step in the bed connected in fluid flow communication to the product end bed port 16_b_ that is in alignment with the second opening 78 of the first pressure equalization channel. The second pressure equalization channel 42 and third pressure equalization channel 46 are used to implement a dual equalization depressurization step in the bed connected in fluid flow communication to the pair of bed ports 16 that are in alignment with the first openings 72, 82 of said channels and a dual equalization repressurization step in the bed connected in fluid flow communication to the pair of bed ports 16 that is in alignment with the second openings 74, 80 of said channels.

It should be noted that in other arrangements, where the rotary valve is for use in implementing a PSA cycle having a greater or lesser number of equalization steps, a greater or lesser number of equalization channels may be present (including no such channels being present where a PSA cycle having no such steps is to be implemented).

Figures 3, 4, 5:
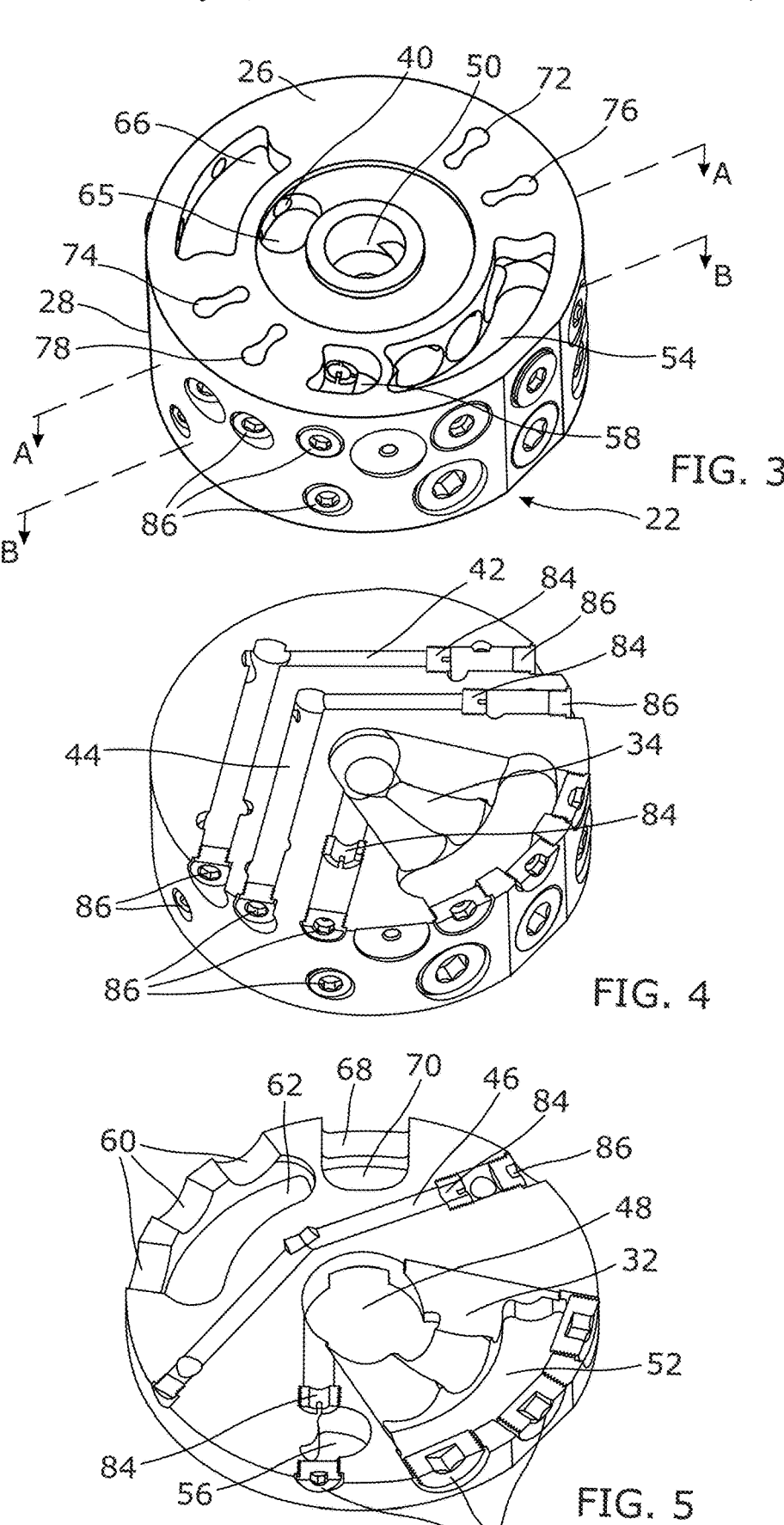
FIG. 3 is an isometric view of the rotor of the rotary valve assembly of FIG. 1, with the product side of the rotor facing upwards.
FIG. 4 is a isometric cross-section view of the rotor of the rotary valve assembly of FIG. 1, taken along the cutting plane A-A shown in FIG. 3.
FIG. 5 is a isometric cross-section view of the rotor of the rotary valve assembly of FIG. 1, taken along the cutting plane B-B shown in FIG. 3.
Figures 6, 7, 8:
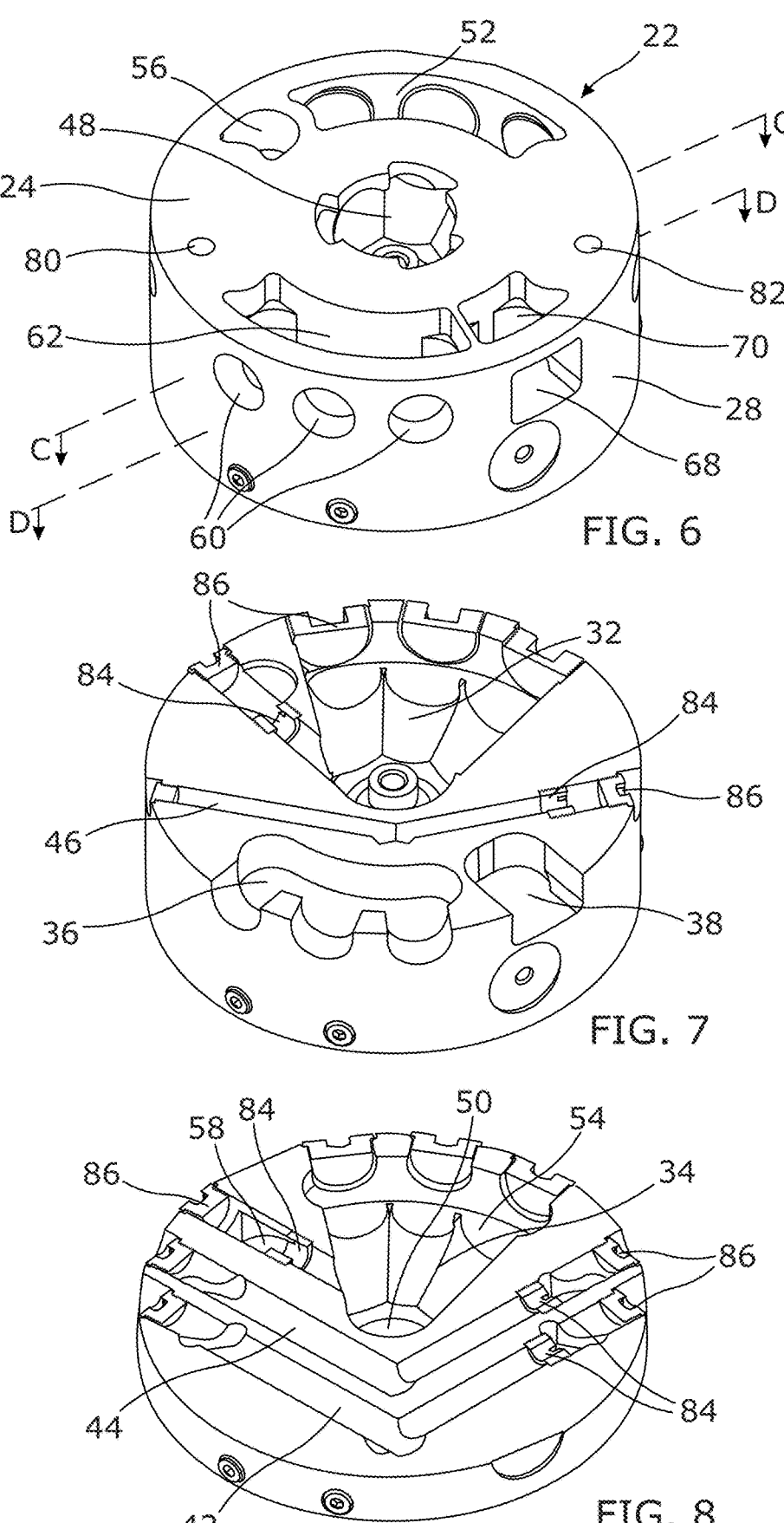
FIG. 6 is an isometric view of the rotor of the rotary valve assembly of FIG. 1, with the feed side of the rotor facing upwards.
FIG. 7 is a isometric cross-section view of the rotor of the rotary valve assembly of FIG. 1, taken along the cutting plane C-C shown in FIG. 6.
FIG. 8 is a isometric cross-section view of the rotor of the rotary valve assembly of FIG. 1, taken along the cutting plane D-D shown in FIG. 6.

As can be seen from FIGS. 3 and 6 in particular, most of the channel openings that come into and out of alignment with the bed ports have an inverse circle shaped leading edge and/or lagging edge. More specifically, the second opening 52 of the feed channel 32 has inverse circle shaped leading and lagging edges, the third opening 56 of the feed channel 32 has an inverse circle shaped leading edge, the second opening 62 of the first blowdown channel 36 has an inverse circle shaped lagging edge, the second opening 70 of the second blowdown channel 38 has an inverse circle shaped leading edge, the first 76 and second 78 openings of the first pressure equalization channel 44 has inverse circle shaped leading and lagging edges, the first 72 and second 74 openings of the second pressure equalization channel 42 have inverse circle shaped leading and lagging edges, the second opening 54 of the product channel 34 has inverse circle shaped leading and lagging edges, the third opening 58 of the product channel 34 has an inverse circle shaped leading edge, and the second opening 66 of the purge channel 40 has inverse circle shaped leading and lagging edges. These inverse circle shaped leading/lagging edges help to maximize the size (area) of the openings that can be used for any given area of the end faces, as they allow the openings to be spaced more compactly around the circumference of the faces. These benefits are particularly pronounced for the openings of any channels, such as for example the equalization channels, that interact with the bed ports for only a short period of time.

The rotor may be manufactured by any suitable means known in the art and may be made of any suitable materials that will handle the operating conditions to which the rotor will be exposed during use. As noted above, may comprise a unitary component formed of a single part, or it may be formed of two or more parts that are rigidly attached to each other. These part or parts may, for example, be made by machining, molding, 3-D printing or a combination thereof. In a preferred embodiment, the part or parts of the rotor are made of metal.

As is also shown in FIGS. 3 to 8, various of the channels of the rotor are also fitted with removable fittings 84 for restricting the flow rate of fluid through each of said channels between the channels' openings. In the depicted embodiment, the feed channel 32, the product channel 34, and each of the first 44, second 42 and third 46 equalization channels are all provided with such a fitting 84. The fitting in the feed channel 32 is located between the third opening 56 and the first 48 and second 52 openings of said channel, so as to restrict the rate of flow of fluid from the first opening 48 to the third opening 56. The fitting in the product channel 34 is located between the third opening 58 and the first 50 and second 54 openings of said channel, so as to restrict the rate of flow of fluid from the second opening 54 to the third opening 58. The fittings may, for example, take the form of threaded flow control orifice (i.e. and orifice having an external thread that mates with an internal thread of the channel).

These flow control fittings 84 allow the rotor 22 to be made with channels that are wide enough to accommodate a range of flows and then fitted with said fittings that allow the flow rates through the channels in question to be limited to narrower ranges tailored and suitable for the specific adsorption process based process with which the rotary valve assembly is to be used. This allows one rotor to be adapted for use in different processes or under different process conditions.

In a particularly preferred arrangement, the flow control fittings 84 are inserted into the channels via openings in the side surface 28 of the rotor which openings are then sealed with removable plugs 86 (which may be separate from or integral with the flow control fittings). This allows the fittings 84 to be removed and replaced as necessary (for example for repair or in the event that a different fitting setting a different flow rate is required) even when the rotor is installed and in place as part of the rotor assembly, so long as access can be gained to the side surface of the rotor (no access to the sealing surfaces of the rotor being needed).

The rate of flow of the purge gas during the purge step of a PSA based process often requires fine tuning, and thus rather than attempting to control the flow rate of the purge gas through use of a flow control fitting internal to the rotor or housing, it is preferred that the flow rate of the purge gas though the purge inlet port 20 and into the purge channel 40 of the rotor 22 is controlled using an adjustable valve (not shown) external to the housing 10 of the rotary valve assembly.

In a variant arrangement (not shown), the rotor 22 could be fitted with one or more check valves in addition to, or in place of, one or more (or all) of the flow control fittings 84. For example, instead of or in addition to the flow control fitting 84 located in the product channel 34 located between the third opening 58 and the first 50 and second 54 openings of said channel, the product channel 34 could be fitted with a check valve located between the third opening 58 and the first 50 and second 54 openings in order to prevent any backflow of gas from the third opening to the first 50 and second 54 openings from occurring. In another example, the purge channel 40 could be fitted with a check valve between the first opening 65 and second opening 66 of said channel in order to prevent any backflow of gas from the second opening 66 to the first opening from occurring (which could in particular be beneficial in circumstances where the purge step is being commenced at a point in time when the pressure in the bed has not yet been reduced to the lowest level and where there could, therefore, be some risk of the pressure in a bed at the start of the start of the purge step being still sufficiently high as to be able to cause backpressure in the purge channel).

Referring again to FIG. 2 in particular, rotation of the rotor 22 within the housing 10 is driven by a hollow drive shaft 88 connected to the rotor 22 and that forms a conduit between the feed port 12 of the housing and the first opening 48 of the feed channel 32 for transfer of the feed stream from the feed port to and into the feed channel. To best accommodate said drive shaft 88, the feed end bed ports 16a are preferably (and as shown) angled outwards away from the axis of rotation of the rotor. The drive shaft 88 has an inlet opening 90 (or, as shown, a set of inlet openings 90) adjacent the feed port 12 which receives the feed stream from the feed port, the feed stream then being conveyed though the hollow interior of the drive shaft to and into the first opening 48 of the feed channel 32. The rotation of the drive shaft 88 is in turn driven by a gearbox 94 that is in turn driven by a motor (95). The gear box 94 may for example be a single speed reduction gearbox, and a variable frequency drive (VFD) controller may be used to supply power to the motor 95. The drive shaft 88 also contains a central tie rod 92 connecting the drive shaft to the rotor 22, in order to assist with pulling the rotor onto the drive shaft and keeping the rotor and drive shaft rigidly attached. The use of a hollow drive shaft to convey the feed steam to the rotor, and use of angled feed end bed ports to accommodate the drive shaft, again provides for a more compact design. It should be noted that the use of a hollow drive shaft with central tie rod does of course have lower moment-bearing capacity than a solid drive shaft of a similar size. However, due to the pressure-balanced arrangement of the feed and product channels described above, less moment bearing capacity is needed.

Figure 10A:
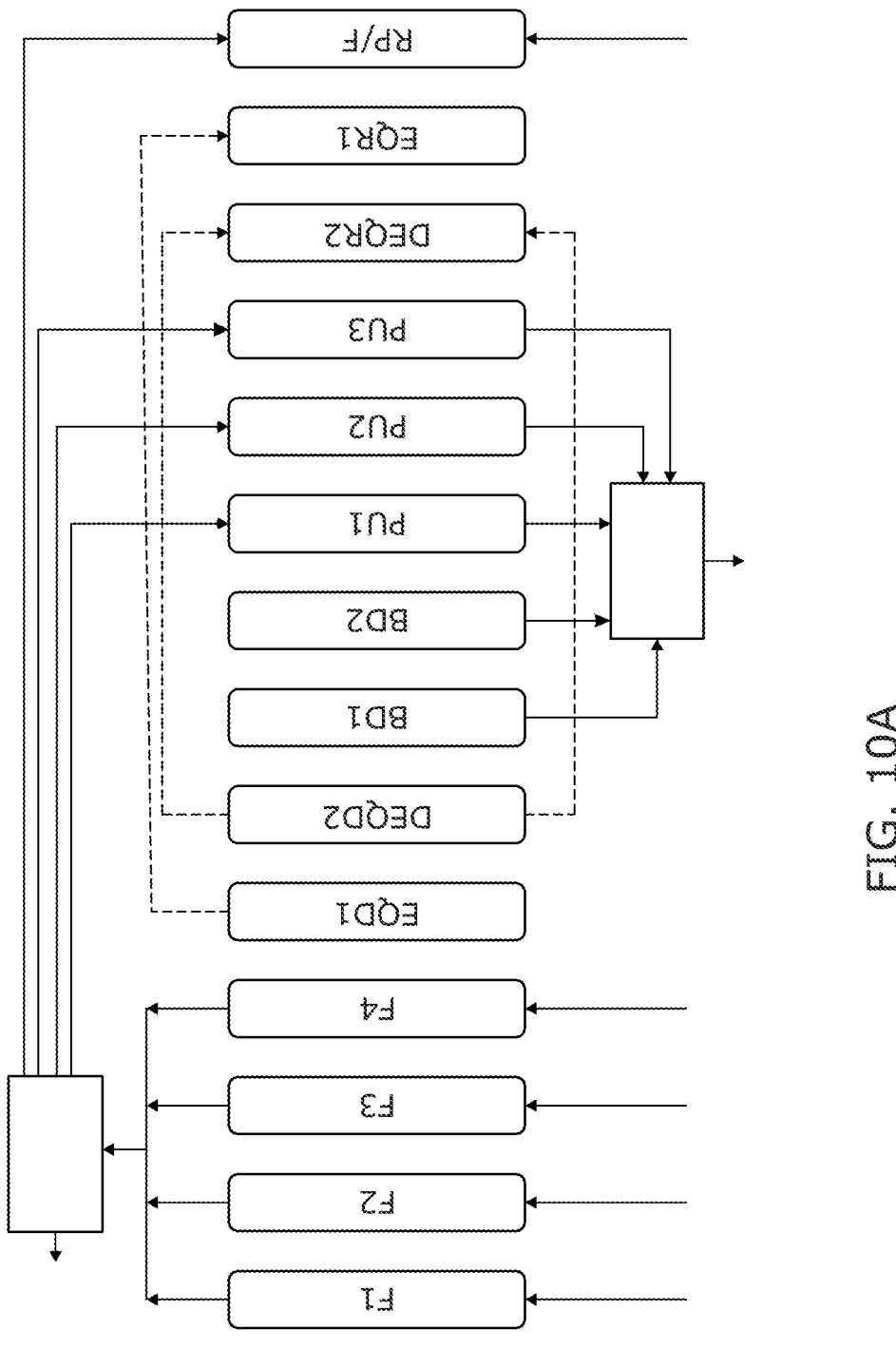
FIG. 10A is a schematic that depicts the sequence of steps involved in one full PSA cycle and that shows the gas flows into, out of or through a given bed in each step.

Referring now to FIG. 10, an exemplary 7-bed multi-step PSA process is shown that can be carried out using an adsorption based separation apparatus comprising seven adsorbent beds connected in fluid flow communication to the rotary valve assembly depicted in FIGS. 1 to 9. In the illustrated process each of the seven adsorbent beds undergoes a PSA cycle consisting of a feed step (F1, F2, F3, F4), an equalization depressurization step (EQD1), a dual equalization depressurization step (DEQD2), a blowdown step (BD1, BD2), a purge step (PU1, PU2, PU3), a dual equalization re-pressurization step (DEQR2), an equalization re-pressurization step (EQR1), and a re-pressurization with product and feed step (RP/F). FIG. 10A shows the sequence of steps involved in one full PSA cycle (for example, a given bed undergoes a feed step (F1 to F4) during the first four segment of times of the cycle, then an equalization depressurization step (EQD1) during a fifth segment of time of the cycle, and so on). FIG. 10A also and shows the gas flows into, out of, or through a given bed in each step. FIG. 10B is a table showing which step of the PSA cycle each bed is undergoing at any given point in time, each row of the table representing one of the seven beds, and each column representing a segment of time of the cycle (wherein in the first segment of time shown in the table the first bed as listed in the table is undergoing a first part (F1) of the feed step, the next bed as listed in the table is undergoing a third part (F3) of the feed step, the next bed as listed in the table is undergoing the equalization depressurization step (EQD1), as so on).

Each of the seven beds is connected in fluid flow communication to a different one of the seven pairs of bed ports 16 of the housing 10 of the rotary valve assembly 1, the feed end of each bed being connected in fluid flow communication to the feed end bed port 16a of the pair of bed ports 16 to which it is connected, and the product end of each bed being connected in fluid flow communication to the product end bed port 16b of the pair of bed ports 16 to which it is connected. Rotation of the rotor 22 within the housing 10 initiates and terminates each step of the PSA cycle in each of the beds, in the following cyclic manner. For ease of understanding, the steps of the PSA cycle will be explained with reference to just one of the beds, it being understood however that the other beds are at the same time undergoing the same cycle but with the steps of the cycle being staggered in each bed in the manner shown in FIG. 10B.

The feed step (F1, F2, F3, F4) commences in a bed when both the second opening 52 of the feed channel 32 comes into alignment with the feed end bed port 16a that is connected to the bed, and the second opening 54 of the product channel 34 comes into alignment with the product end bed port 16b that is connected to the bed. During this step the feed gas is introduced into the feed port 12 of the rotary valve assembly 1 at a first pressure and passes through the feed channel 32 and into and through the bed, where one or more components of the feed stream are adsorbed preferentially to one or more other components of the feed. The resulting product stream exiting the bed, which stream is now depleted in the preferentially adsorbed components and enriched in the other components, then passes through the product channel 34 and is withdrawn from the product port 14 of the rotary valve assembly 1.

After a period of the of the rotor 22 within the housing 10 brings the second opening 52 of the feed channel 32 and the second opening 54 of the product channel 34 out of alignment with, respectively, the feed end bed port 16a and product end bed port 16b to which the bed is connected, thereby terminating the feed step in the bed.

Following further rotation of the rotor 22, the first opening 76 of the first pressure equalization channel 44 comes into alignment with the product end bed port 16b that is connected to the bed, commencing the equalization depressurization step (EQD1) in the bed during which gas is withdrawn from the product end of the bed and passes through the first pressure equalization channel 44, reducing the pressure in the bed. After a period of time, further rotation of the rotor then brings the first opening 76 of the first pressure equalization channel 44 out of alignment with the product end bed port 16b that is connected to the bed, thereby terminating this step in the bed.

Following further rotation of the rotor 22, the first opening 72 of the second pressure equalization channel 42 comes into alignment with the product end bed port 16b that is connected to the bed and the first opening 82 of the third pressure equalization channel 46 comes into alignment with the feed end bed port 16a that is connected to the bed, commencing the dual equalization depressurization step (DEQD2) in the bed during which gas is withdrawn from the product end of the bed, passing through the second pressure equalization channel 42, and from the feed end of the bed, passing through the third pressure equalization channel 46, thereby further reducing the pressure in the bed. After a period of time, further rotation of the rotor then brings the first openings 72, 82 of the second 42 and third 46 pressure equalization channels out of alignment with, respectively, the product end 16b and feed end 16a bed ports that are connected to the bed, thereby terminating this step in the bed.

Following further rotation of the rotor 22, the second opening 70 of the second blowdown channel 38 comes into alignment with the feed end bed port 16a that is connected to the bed, commencing a first part of the blowdown step (BD1) in the bed during which a blowdown gas is withdrawn from the feed end of the bed, passes through the second blowdown channel 38 and is withdrawn from the blowdown port 18 of the rotary valve assembly 1 thereby further reducing the pressure in the bed.

Following further rotation of the rotor 22, the second opening 62 of the first blowdown channel 36 comes into alignment with the feed end bed port 16a that is connected to the bed, commencing a second part of the blowdown step (BD2) in the bed during which a blowdown gas is withdrawn from the feed end of the bed, passes through the first blowdown channel 36 and is withdrawn from the blowdown port 18 of the rotary valve assembly 1 thereby further reducing the pressure in the bed down to a second pressure.

Following further rotation of the rotor 22, the second opening 66 of the purge channel 40 also comes into alignment with the product end bed port 16b that is connected to the bed (while the second opening 62 of the first blowdown channel 36 is still in alignment with the feed end bed port 16a connected to the bed), thereby terminating the blowdown step (BD1, BD2) and commencing the purge step (PU1, PU2, PU3) in the bed, during which a purge gas stream introduced into the purge inlet port 20 of the rotary valve assembly 1 passes through the purge channel 40 and into and through the bed at the second pressure, resulting in a blowdown gas that is withdrawn from the feed end of the bed at the second pressure, passes through the first blowdown channel 36 and is withdrawn from the blowdown port 18 of the rotary valve assembly 1.

During the blowdown (BD1, BD2) and purge (PU1, PU2, PU3) steps the components of the feed stream that were adsorbed by the bed in the preceding feed step are desorbed from the bed and removed in the blowdown gases withdrawn from the blowdown port 18, such that the adsorbent in the adsorbent bed is regenerated and can again be used for adsorbing components of the feed stream (in the next feed step after the bed has again been repressurized).

After a period of time, further rotation of the of the rotor 22 brings the second opening 62 of the first blowdown channel 36 and the second opening 66 of the purge channel 40 out of alignment with, respectively, the feed end 16a and product end 16b bed port 16b to which the bed is connected, thereby terminating the purge step (PU1, PU2, PU3) step in the bed.

Following further rotation of the rotor 22, the second opening 74 of the second pressure equalization channel 42 comes into alignment with the product end bed port 16b that is connected to the bed and the second opening 80 of the third pressure equalization channel 46 comes into alignment with the feed end bed port 16a that is connected to the bed, commencing the dual equalization repressurization step (DEQR2) in the bed during which gas passing through the second pressure equalization channel 42 (from another bed that is at that time undergoing the dual equalization depressurization step, DEQD2) is introduced into the product end of the bed, and gas passing through the third pressure equalization channel 46 (from the other bed that is at that time undergoing the dual equalization depressurization step, DEQD2) is introduced into the feed end of the bed, thereby increasing the pressure in the bed. After a period of time, further rotation of the rotor then brings the second openings 74, 80 of the second 42 and third 46 pressure equalization channels out of alignment with, respectively, the product end 16b and feed end 16a bed ports that are connected to the bed, thereby terminating this step in the bed.

Following further rotation of the rotor 22, the second opening 78 of the first pressure equalization channel 44 comes into alignment with the product end bed port 16b that is connected to the bed, commencing the equalization repressurization step (EQR1) in the bed during which gas passing through the first pressure equalization channel 44 (from another bed that is at that time undergoing the equalization depressurization step, EQD1) is introduced into the product end of the bed, thereby further increasing the pressure in the bed. After a period of time, further rotation of the rotor then brings the second opening 78 of the first pressure equalization channel 44 out of alignment with the product end bed port 16*b* that is connected to the bed, thereby terminating this step in the bed.

Finally, following further rotation of the rotor 22, the third opening 56 of the feed channel 32 comes into alignment with the feed end bed port 16*a* that is connected to the bed and the third opening 58 of the product channel 34 comes into alignment with the product end bed port 16*b* that is connected to the bed, commencing the re-pressurization with product and feed step (RP/F) during which some of the feed stream passing through the feed channel 32 is passed to and through the third opening 56 of the feed channel 32 and into the feed end of the bed and some of the product stream passing through the product channel 34 is passed to and through the third opening 58 of the product channel 34 and into the product end of the bed, thereby further increasing the pressure in the bed back up to the first pressure. The bed is then ready to recommence the PSA cycle starting with the feed step, as occurs on further rotation of the rotor 22 to bring the second openings 52, 54 of the feed 32 and product 34 channels back into alignment with the feed end 16*a* and product end 16*b* bed ports of the bed.

Figure 11:
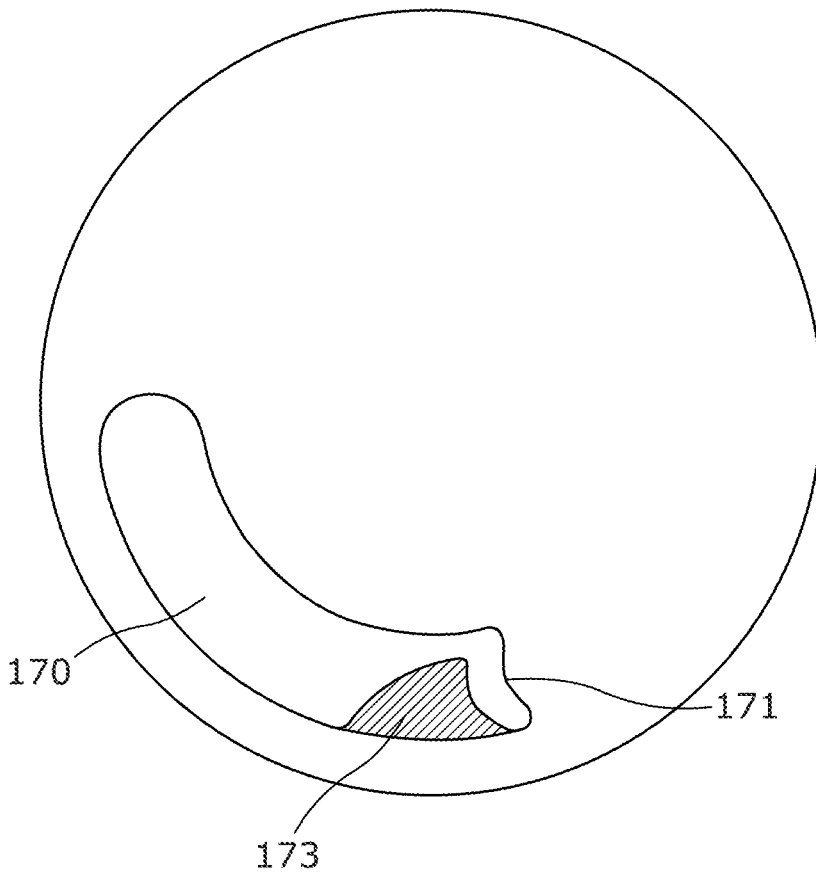
FIG. 11 is a simplified schematic depicting an alternative design for the second opening of the blowdown channel in a variant of the rotor of the rotary valve assembly of FIG. 1.

Referring now to FIGS. 11, an alternative design for the second opening of a blowdown channel is shown, as may be used in a variant embodiment of the rotor of the rotary valve assembly of FIGS. 1 to 9. As is illustrated, in this alternative design, the blowdown channel (which may be the first or second blowdown channel of the rotor of FIGS. 1 to 9 or a single blowdown channel replacing the two channels in the rotor of FIGS. 1 to 9) has a second opening 170 that has the shape of an arcuate slot of non-uniform width, whereby the slot has a section 173 near the leading edge 171 of the slot where the width the slot narrows at the leading end of the section and then gradually widens towards the lagging end of the section. This non-uniform shape may be provided by forming (e.g. machining, molding or 3-D printing) the slot with the desired shape, or by forming the slot as a slot of uniform width, and then inserting an insert into the slot (bolted or otherwise fixed in place by any suitable means) in order to provide the slot with the desired non-uniform width.

The purpose of this section 173 near the leading edge 171 of the slot is to create a shape of the opening that allow a constant mass flow rate (or as constant as possible) of blowdown gas to enter the blowdown channel, particularly at the start of the blowdown step shortly after the second opening 170 has come into alignment with the feed end bed port 16*a* when the pressure in the bed undergoing the blowdown step is at its highest. Having a constant mass flow rate of the blowdown gas is particularly useful in some PSA based process that are used for hydrogen generation, where the blowdown gas is typically sent to a gas burner. In such applications, a consistent flow rate of gas to the burner allows for a more stable flame and less thermal cycling on furnace equipment. Supply of the blowdown gas from the rotary valve assembly at a constant (or more constant) mass flow rate would therefore allow for a smaller surge vessel than that which is currently used to dampen peak flows.

The manner in which the non-uniform section 173 provides for a constant (or more constant) mass flow rate of the blowdown gas is as follows. In accordance with the known formula for calculating flow rate through an orifice, the flow rate of blowdown gas entering the blowdown channel will be proportional to: (a) the open area of the slot (second opening 170) of the blowdown channel that overlaps with the feed end bed port; and (b) pressure differential between the gas in the bed and the gas in the blowdown channel. In order to achieve a constant mass flow rate, the ideal open area of the slot overlapping with the feed end bed port will therefore be low at the early stages of the blowdown step (when the pressure in the bed is higher) but will increase as the pressure in the bed decreases. At the very start of the blowdown step, when the leading edge of the slot first passes over the leading edge of the feed end bed port, the open area overlapping with the bed port will always be small and thus the width of the slot at the leading edge is kept at its maximum. Shortly after this the width of the slot decreases to a minimum and then gradually increases, so that as the rotor continues rotates and brings more of the slot over the bed port the open area of the slot overlapping with the bed port increases in a more gradual manner proportionate to the decreasing pressure in the bed as the blowdown step continues.

Figures 12, 13:
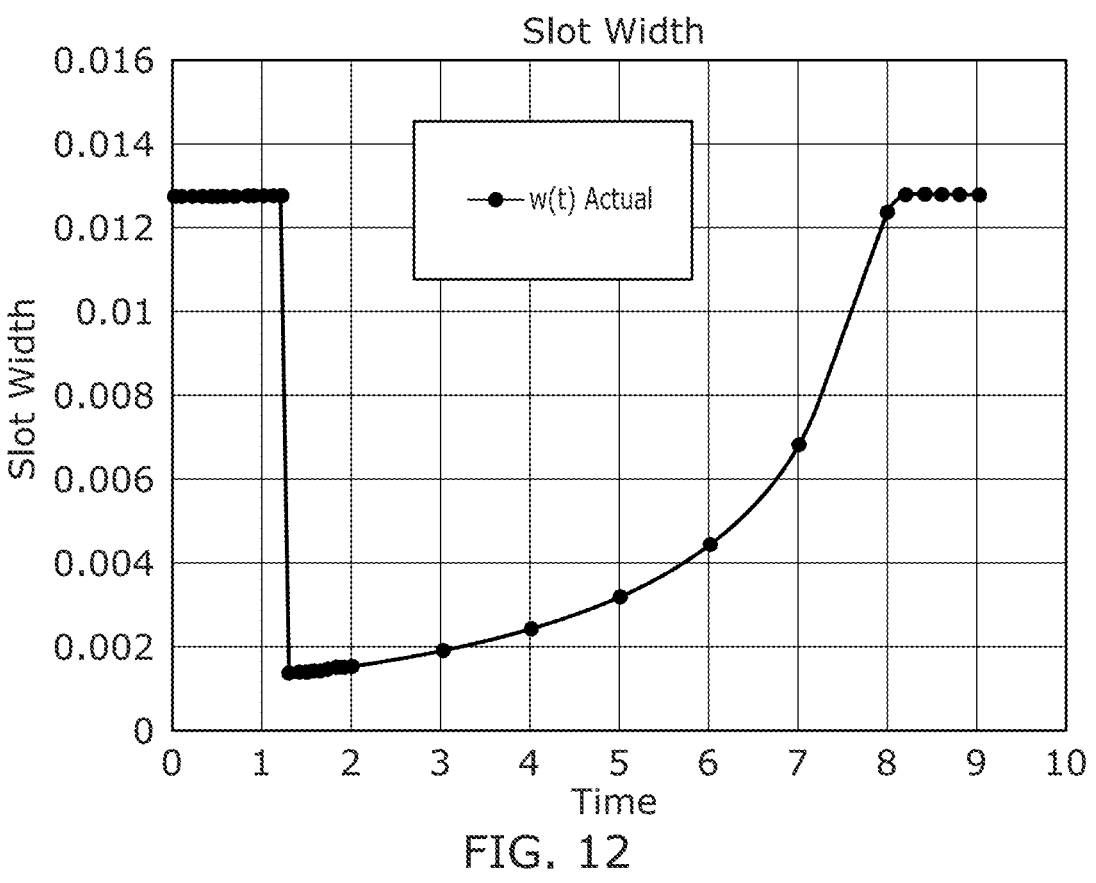
FIG. 12 is a graph plotting, as a function of time, the width of the second opening of the blowdown channel of FIG. 11 that is passing the leading edge of the feed end bed port of the valve housing as the second opening passes over the feed end bed port.
FIG. 13 is a graph plotting, as a function of time, the open area of the second opening of the blowdown channel of FIG. 11 that overlaps with the feed end bed port of the valve housing as the second opening passes over the feed end bed port.
Figure 14:
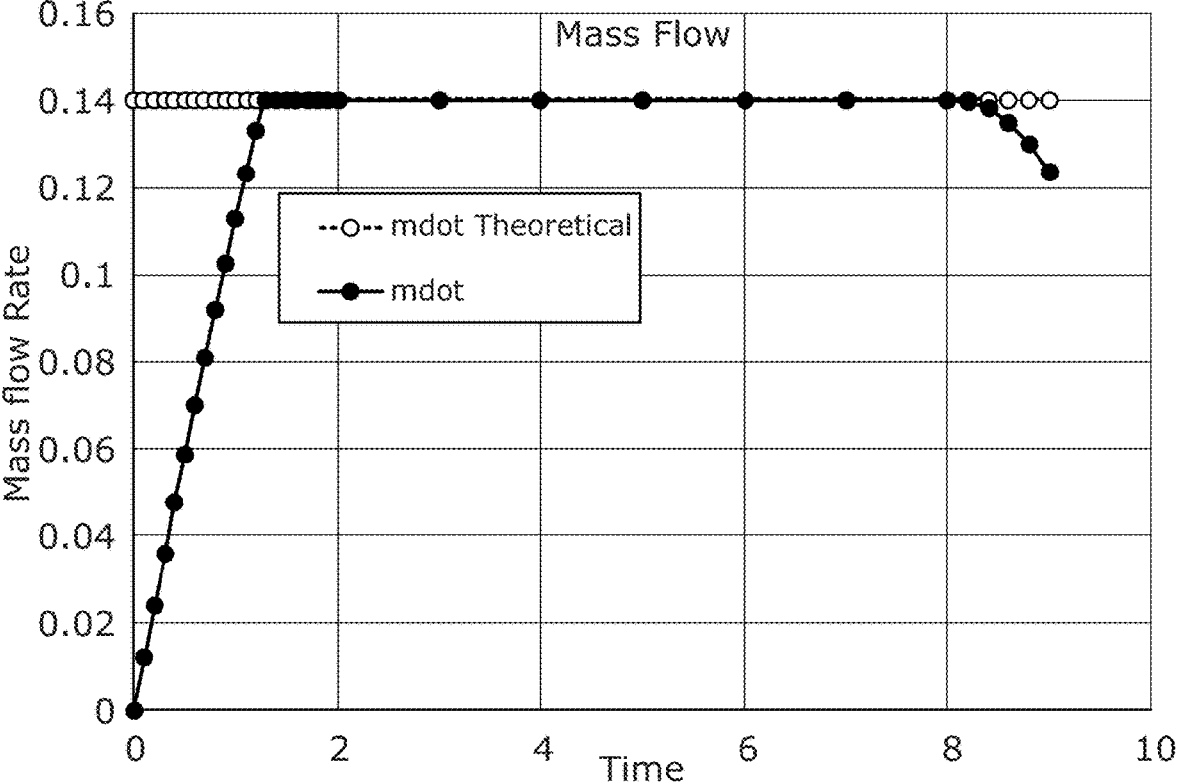
FIG. 14 is a graph plotting, as a function of time, the resulting mass flow rate through the blowdown channel of FIG. 11 as the second opening passes over the feed end bed port.

This principle is further illustrated in FIGS. 12 to 14. FIG. 12 is a graph plotting, as a function of time, the width of the second opening 170 of the blowdown channel that is passing the leading edge of the feed end bed port 16*a* of the valve housing as the second opening passes over the feed end bed port. FIG. 13 is a graph plotting, as a function of time, the open area of the second opening 170 of the blowdown channel that overlaps with the feed end bed port 16*a* of the valve housing as the second opening passes over the feed end bed port. FIG. 14 is a graph plotting, as a function of time, the resulting mass flow rate through the blowdown channel as the second opening 170 passes over the feed end bed port 16*a*. As can be seen, shortly after the leading edge of the second opening 170 passes over the leading edge of the feed end bed port 16*a* the non-unform section 173 results in the width of the second opening 170 of the blowdown channel, that is passing the leading edge of the feed end bed port, rapidly narrowing and then gradually widening again. This, in turn, results in the open area of the second opening 170 of the blowdown channel, that overlaps with the feed end bed port 16*a*, increasing gradually as the second opening 170 moves over the feed end bed port 16*a*. This gradually increasing open area in turn counterbalances the dropping pressure in the bed at the start of the step, thereby leading to a more constant mass flow rate through the blowdown channel.

Figure 15:
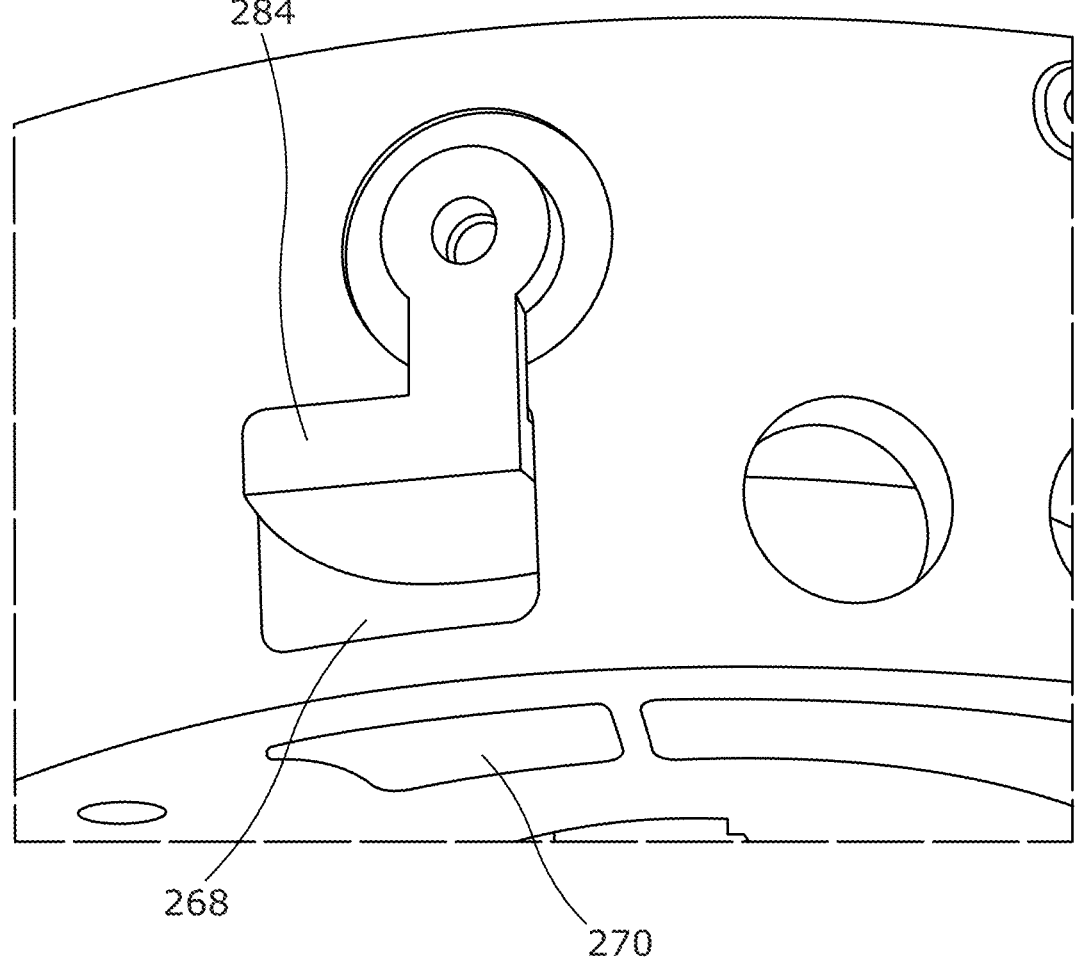
FIG. 15 is a detailed isometric view of the first opening of the blowdown channel in another variant of the rotor of the rotary valve assembly of FIG. 1.

Referring now to FIG. 15, an alternative arrangement is shown for the first opening of the first blowdown channel in accordance with another embodiment of the rotor of the rotary valve assembly. In this embodiment, the first opening 268 of the first blowdown channel has been fitted with a removable fitting 284 for restricting the flow rate of fluid through the channel between the second opening 270 and the first opening 268 of the channel. In the illustrated embodiment, the fitting 284 takes the form of a bolted/removable insert that limits the flow rate of the blowdown gas exiting the first blowdown slot. The reasoning behind this is, again, that limit the mass flow rate of blowdown gas, particularly at the start of the blowdown step when the pressure in the bed undergoing the blowdown step is at its highest, can be beneficial (for the same reasons as discussed above in relation to the embodiment depicted in FIG. 11). Unlike the arrangement depicted in FIG. 11, the fitting 284 in FIG. 15 does not provide for a constant flow rate but rather simply limits peak flows. It is, however, simpler to manufacture and implement than the arrangement depicted in FIG. 11.

The rotary valve assemblies described herein avoid the need for separate feed and product rotors as often used in the prior art. The disclosed arrangements, with a single rotor and rotor housing, provide a more compact and robust design that costs less and has more flow capacity compared to existing technology.

The invention claimed is:

1. An adsorption based separation process, wherein the process uses an adsorption based separation apparatus comprising: (i) a plurality of adsorbent beds, each of the adsorbent beds having a feed end and a product end; and (ii) a rotary valve assembly comprising a housing and a rotor rotatably mounted within the housing; and (iii) a motor driving rotation of the rotor of the rotary valve assembly:

wherein the housing has a feed port for introduction of a feed stream, a product port for withdrawal of a product stream, and a plurality of pairs of bed ports, each pair of bed ports of the plurality of pairs of bed ports being connected in fluid flow communication to a different one of the plurality of adsorbent beds, each pair of bed ports consisting of a feed end bed port for sending fluid to or receiving fluid from a feed end of the adsorbent bed to which it is connected and a product end bed port for sending fluid to or receiving fluid from a product end of the adsorbent bed to which it is connected;

wherein the rotor comprises a component that has a first end surface, a side surface and a second end surface and contains a plurality of channels that are separate from each other and comprise at least a feed channel and a product channel, said component being a unitary component or a component formed of two or more parts that are rigidly attached to each other;

wherein the first and second end surfaces of the rotor form flat sealing surfaces with the housing, the feed channel has a first opening in the first end surface that is in fluid flow communication with the feed port, the product channel has a first opening in the second end surface that is in fluid flow communication with the product port, and the feed channel has a second opening in the first end surface that can, via rotation of the rotor within the housing, be brought into and out of alignment and hence fluid flow communication with each feed end bed port, and the product channel has a second opening in the second end surface that can, via rotation of the rotor within the housing, be brought into and out of alignment and hence fluid flow communication with each product end bed port, such that via rotation of the rotor within the housing the second openings of the feed and product channels can be brought into and out of fluid flow communication with each pair of bed ports; and wherein the process comprises:

introducing the feed stream into the feed port of the rotary valve assembly, the feed stream comprising two or more components;

operating the motor so as to rotate the rotor of the rotary valve assembly so as to cyclically bring each adsorbent bed into and out of fluid flow communication with the feed and product channels of the rotor;

for each adsorbent bed, when the adsorbent bed is in fluid flow communication with the feed and product channels of the rotor, delivering the feed stream from the feed channel to the adsorbent bed, adsorbing one or more components of the feed stream preferentially to one or more other components of the feed stream so as to produce the product stream, which is enriched in said one or more other components of the feed stream, and withdrawing the product stream from the adsorbent bed into the product channel;

withdrawing the product stream from the product port of the rotary valve assembly; and for each adsorbent bed, during a period of time when the adsorbent bed is not in fluid flow communication with the feed and product channels of the rotor, desorbing adsorbed components of the feed gas stream from the adsorbent bed and withdrawing a blowdown stream from the adsorbent bed comprising said desorbed components.

2. The adsorption based separation process as claimed in claim 1, wherein the adsorption based separation process is a pressure swing adsorption based process, wherein:

the feed stream is introduced into the feed port of the rotary valve assembly at a first pressure; and the step of desorbing adsorbed components of the feed gas stream from the adsorbent bed and withdrawing a blowdown stream from the adsorbent bed comprising said desorbed components comprises reducing the pressure in the adsorbent bed from the first pressure to a second pressure by withdrawing as a first part of the blowdown stream a blowdown gas comprising said desorbed components, and introducing a purge gas into the adsorbent bed and withdrawing as a second part of the blowdown stream and at the second pressure a blowdown gas comprising the purge gas and said desorbed components.

* * * * *